United States Patent
Powell et al.

(10) Patent No.: US 8,117,686 B2
(45) Date of Patent: *Feb. 21, 2012

(54) DURABLE PROTECTIVE COVER FOR PREVENTING SPILLED LIQUIDS FROM FLOWING INTO DRAINS OR HOLES

(75) Inventors: Beth P. Powell, State College, PA (US); R. Douglas Evans, Jr., Everett, PA (US)

(73) Assignee: New Pig Corporation, Tipton, PA (US)

( * ) Notice: Subject to any disclaimer, the term of this patent is extended or adjusted under 35 U.S.C. 154(b) by 615 days.

This patent is subject to a terminal disclaimer.

(21) Appl. No.: 12/341,653

(22) Filed: Dec. 22, 2008

(65) Prior Publication Data
US 2009/0100584 A1    Apr. 23, 2009

Related U.S. Application Data

(63) Continuation-in-part of application No. 11/584,849, filed on Oct. 23, 2006, now Pat. No. 7,950,075, which is a continuation-in-part of application No. 11/189,660, filed on Jul. 26, 2005, now abandoned, which is a continuation-in-part of application No. 10/447,364, filed on May 28, 2003, now abandoned.

(51) Int. Cl.
*A47K 1/14* (2006.01)
(52) U.S. Cl. ......................................................... 4/293
(58) Field of Classification Search .......... 4/293; 404/4; 405/52
See application file for complete search history.

(56) References Cited

U.S. PATENT DOCUMENTS

| | | | |
|---|---|---|---|
| 962,570 | A | 6/1910 | Hufschmidt |
| 1,622,850 | A | 3/1927 | Schacht |
| 1,742,369 | A | 1/1930 | Probst et al. |
| 1,825,499 | A | 9/1931 | Zorn |
| 1,912,312 | A | 5/1933 | Schacht |
| 2,611,904 | A | 9/1952 | Gross |
| 4,031,676 | A | 6/1977 | Dally |
| 4,139,117 | A | 2/1979 | Dial |

(Continued)

FOREIGN PATENT DOCUMENTS
DE    202 10573 U1    11/2002
(Continued)

OTHER PUBLICATIONS
New Pig Corporation, 1999 Product Catalog p. 81 for Drainblocker Drain Plug.

*Primary Examiner* — Lori Baker
(74) *Attorney, Agent, or Firm* — Benjamin T. Queen, II; Alan G. Towner, Esq.; Pietragallo Gordon Alfano Bosick & Raspanti, LLP

(57) ABSTRACT

Durable protective covers for drains and other holes are provided which prevent spills and unwanted liquids from flowing therein. The protective covers include a durable backing layer and a pliable, tacky sealing layer which conforms and adheres to a surface surrounding the drain to reduce or eliminate the flow of liquids into the drain. A low-density bonding layer is provided between the pliable, tacky sealing layer and the durable backing layer in order to provide significantly improved adherence between the layers.

19 Claims, 2 Drawing Sheets

U.S. PATENT DOCUMENTS

| | | |
|---|---|---|
| 4,208,469 A | 6/1980 | Dial |
| 4,230,753 A | 10/1980 | Sheyon |
| 4,765,775 A | 8/1988 | Kroger |
| 4,799,821 A | 1/1989 | Brodersen |
| 4,813,811 A | 3/1989 | Adams |
| 4,838,732 A | 6/1989 | Clark et al. |
| 4,981,391 A | 1/1991 | Klementovich |
| 4,988,234 A | 1/1991 | Henkel et al. |
| 5,236,281 A | 8/1993 | Middleton |
| 5,379,555 A | 1/1995 | Strieb et al. |
| 6,338,168 B1 | 1/2002 | Valentine |
| 6,530,722 B1 | 3/2003 | Shaw et al. |
| 2004/0157074 A1 | 8/2004 | Hubbard |
| 2004/0237180 A1 | 12/2004 | Evans, Jr. et al. |
| 2005/0170143 A1* | 8/2005 | Yau ................ 428/141 |
| 2005/0262624 A1 | 12/2005 | Evans, Jr. et al. |
| 2007/0033722 A1 | 2/2007 | Evans, Jr. et al. |

FOREIGN PATENT DOCUMENTS

| | | |
|---|---|---|
| DE | 20 2004 019761 U1 | 5/2006 |
| DE | 10 2007 017410 A1 | 10/2008 |

* cited by examiner

DURABLE PROTECTIVE COVER FOR PREVENTING SPILLED LIQUIDS FROM FLOWING INTO DRAINS OR HOLES

CROSS-REFERENCE TO RELATED APPLICATION

This application is a continuation-in-part of U.S. application Ser. No. 11/584,849 filed Oct. 23, 2006, which is a continuation-in-part of U.S. application Ser. No. 11/189,660 filed Jul. 26, 2005, which is a continuation-in-part of U.S. application Ser. No. 10/447,364 filed May 28, 2003, now abandoned, each of which are incorporated herein by reference.

FIELD OF THE INVENTION

The present invention is directed toward portable protective covers and, more particularly, toward a durable cover for protecting drains, holes and the like from spills and unwanted liquids.

BACKGROUND INFORMATION

It is often desirable to temporarily close off drains to prevent various liquids from flowing therein. Particularly, when handling hazardous liquids in the vicinity of a drain, such as a storm drain or manhole, it is desirable to temporarily seal off the drain to prevent any hazardous liquid that may be accidentally spilled on the ground from entering the drain. Some known methods of sealing off a drain to prevent the possible ingress of liquids include providing custom fitted rigid covers, utilizing manual or automatic cutoff valves, covering the drain with a flexible material (e.g., canvas) and covering the flexible material with dirt or sand, and utilizing a sheet of polyurethane, vinyls, and other pliable materials to cover the drain. However, these known methods of drain isolation have certain practical limitations to their usefulness.

Utilizing custom fitted rigid covers or cutoff valves requires extensive preparation and installation efforts. Manufacturing a custom fitted cover and/or installing cutoff valves are both time consuming endeavors. Neither a custom fitted cover nor an installed cutoff valve can be easily adapted for use in covering and isolating drains other than the one for which the cover or valve was specifically designed, and they cannot be driven over. Moreover, once a custom fitted cover or cutoff valve is in place in a drain or drain system, neither is readily removable and/or transportable to another location for use.

Utilizing a flexible material held in place by dirt, sand or water to seal off a drain also presents certain problems in that such a covering is difficult to work with and is cumbersome and time consuming to implement in emergency situations. The effective seal surrounding the drain is limited by the dirt or sand utilized to hold the flexible material in place, and is further limited in that the dirt or sand may be washed away or eroded during flooding. In addition, water-filled drain blockers cannot be driven over. Such a drain covering has limited reusability and transportability, and the seal effectuated thereby has little resistance to the shear forces of onrushing liquids.

The present invention is directed toward overcoming one or more the above-mentioned problems.

SUMMARY OF THE INVENTION

A durable protective cover for drains and other holes to prevent spills and other liquids from flowing therein is provided. The protective cover of the present invention includes a durable backing layer and a pliable, tacky sealing layer. The backing layer and sealing layer are secured together by a low-density bonding layer adhered to or partially embedded in at least one of the layers. The pliable, tacky sealing layer can be inherently tacky or can include a tackifier thereon such that it may adhere to a surface surrounding the drain to prevent the flow of liquid therebetween.

The protective cover of the present invention is positionable over a drain or other hole such that an exposed surface of the pliable, tacky sealing layer contacts a portion of the surface surrounding the drain or other hole, whereby the protective cover device is adapted for preventing a liquid from passing through the drain or other hole.

An aspect of the present invention is to provide a durable protective cover for installation over a drain comprising a durable backing layer, a pliable, tacky sealing layer structured and arranged to block spills from entering the drain, and a low-density bonding layer between the durable backing layer and the pliable, tacky sealing layer.

This and other aspects of the present invention will be more apparent from the following description.

DETAILED DESCRIPTION

The present invention provides a durable protective cover which prevents spills and/or other unwanted liquids from flowing into drains or holes. At least a portion of the liquid is prevented from flowing into a drain or hole by the protective cover. The spill or unwanted liquid may be any flowable material such as hazardous liquids, storm water, hydrocarbons, chemicals, debris, dirt, trash and the like which are desired to be kept out of drains and the like. As used herein, the term "drains or holes" means any drain, hole or other opening such as a vent, manhole or the like through which it is desired to prevent the flow of spills or unwanted liquids.

Figure 1:
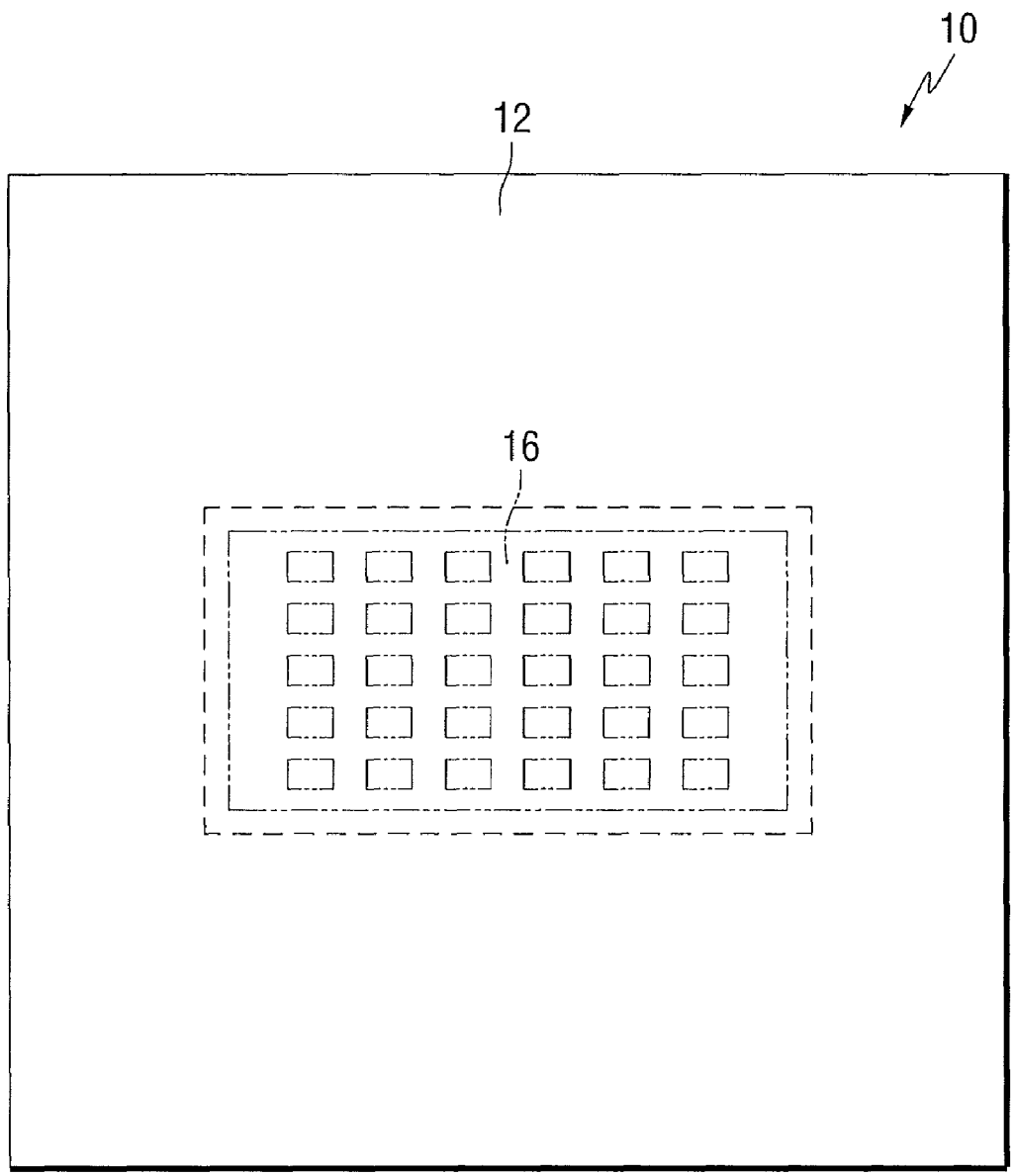
FIG. 1 is a top view of a protective cover in accordance with an embodiment of the present invention.
Figure 2:
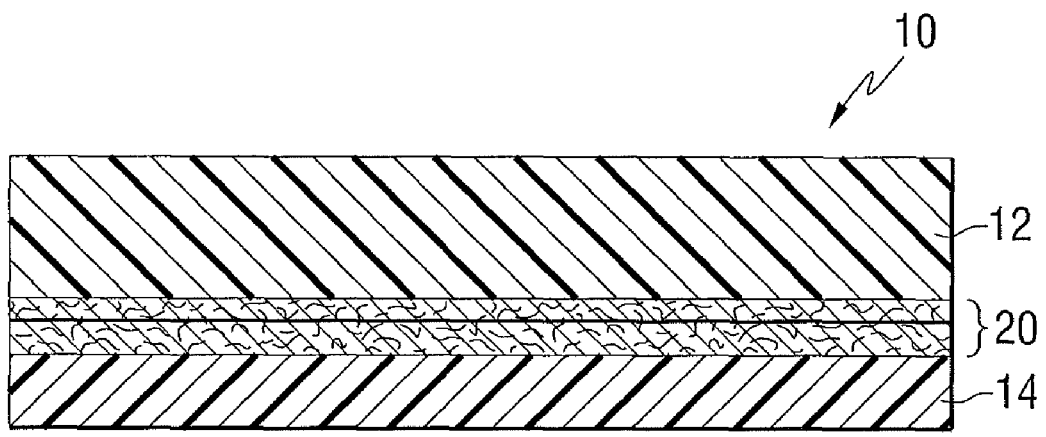
FIG. 2 is a cross-sectional side view of a portion of a protective cover in accordance with an embodiment of the present invention.

FIG. 1 is a top view, and FIG. 2 is a side sectional view, of a durable protective cover 10 in accordance with an embodiment of the present invention. The protective cover 10 includes a durable backing layer 12 and a pliable, tacky sealing layer 14, as most clearly shown in FIG. 2, covering at least a portion of the underside of the durable backing layer 12. A low-density bonding layer is provided between the durable backing layer 12 and the pliable, tacking sealing layer 14. The protective cover 10 shown in FIG. 1 is generally square in shape, however, any other suitable shape may be used such as rectangular, round, etc.

As shown in FIG. 1, the protective cover 10 can be positioned for installation over a drain 16 to prevent unwanted liquid from entering the drain. The protective cover 10 adheres to the surface surrounding a drain 16, forming a seal which is sufficient to prevent the flow of at least some liquid past the protective cover 10. The sealing layer 14 creates an effective seal even when the surface surrounding the drain is not smooth. The protective cover 10 may be utilized to cover virtually any type of drain or hole 16 so long as at least a portion of the pliable, tacky sealing layer 14 of the protective cover 10 is sized to extend beyond the dimensions of the drain 16 and form a sufficient seal therearound. In one embodiment, the protective cover 10 can be positioned over relatively large areas, e.g., at least 1 square foot up to 25 square feet or more. In another embodiment, the protective cover 10 may be provided in strip form for covering a portion of a drain or the area around the drain to act as a dike or spill diverter.

The durable backing layer 12 can have a length of from about 1 foot to about 12 feet, and a width of from about 1 foot to about 12 feet. The sealing layer 14 has a length of from about 1 foot to about 12 feet, and a width of from about 1 foot to about 12 feet. For example, a protective cover 10 positioned over a drain 16 can have a backing layer length and width, as well as a sealing layer length and width, which are at least 2 or 3 inches greater than the length and width of the drain 16.

Both the durable layer 12 and the pliable, tacky sealing layer 14 will resist water, oil and many chemicals making the protective cover 10 suitable for use in many types of work environments, including hazardous work environments. The protective cover 10 is readily reusable and cleans up easily with soap and water.

As shown in FIG. 2, a low-density bonding layer 20 is provided between the pliable, tacky sealing layer 14 and the durable backing layer 12. As used herein, the term "low-density bonding layer" means a deep pile or lofty material having at least one surface comprising entanglement fibers that extend from the layer to provide additional surface area and attachment sites for the adjacent durable backing layer 12 and/or pliable, tacky sealing layer 14. The low-density bonding layer 20 has a density that is typically less than 0.26 ounces per cubic inch, preferably from 0.02 to 0.1 ounces per cubic inch. The low-density bonding layer 20 has a typical thickness of at least 0.01 inch, for example, from 0.02 to 0.25 inch. In one embodiment, the thickness is from 0.04 to 0.06 inch. The low-density bonding layer 20 typically has a weight per area of less than 20 ounces per square yard, for example, from 1 to 10 ounces per square yard. The low-density bonding layer 20 provides secure and permanent attachment between the durable backing layer 12 and the pliable, tacky sealing layer 14, while maintaining separation between the materials of the adjacent layers 12 and 14. In contrast with an open mesh or permeable screen material that would allow the layers 12 and 14 to contact each other, the low-density bonding layer 20 maintains separation between the layers 12 and 14.

The low-density bonding layer 20 may be non-woven and may comprise entanglement fibers made of polyester, polypropylene, poly(ethylene propylene), polyvinylchloride, fiberglass, nylon, cotton, urethane and the like. In one embodiment, the low-density bonding layer 20 comprises a base or backing layer from which the entanglement fibers extend on one or both sides of the backing layer. For example, the low-density bonding layer 20 may comprise fleece made of polyester and having a thickness of 0.055 inch. The fleece assists in the adhesion of the pliable, tacky sealing layer 14 to the durable backing layer 12. The embedded fleece layer may also provide puncture resistance, e.g., when the protective cover is used for drains that are exposed to vehicle traffic. Thus, the protective cover may be driven over.

The durable backing layer 12 is liquid impermeable, and is made of a flexible and durable material. The durable backing layer 12 can have a tensile strength at least 25 percent higher than the tensile strength of the tacky sealing layer 14. In one embodiment, the protective cover 10 has sufficient durability to be driven over by an industrial vehicle while positioned over a drain. The protective cover 10 is also sufficiently durable to withstand foot traffic over the cover. The durable backing layer 12 can comprise any suitable material such as natural rubber, synthetic rubber, nitrile rubber or plastics such as thermoplastic olefin, polyvinyl chloride, chlorosulfonated polyethylene and the like. In one embodiment, the durable backing layer 12 may be a composite material. Examples of composite materials include rubber laminated to plastic film, plastic film laminated to mesh, rubber laminated to mesh and combinations thereof. The thickness of the durable backing layer 12 typically ranges from 0.01 to 0.25 inch.

The pliable, tacky sealing layer 14 is flexible and tacky such that it conforms to irregularities or roughness in the spill surface and adheres to the surface surrounding a drain to thereby provide a seal between the layer 14 and surface which reduces or eliminates the flow of spilled liquids. The pliable, tacky sealing layer 14 is made of a different material from the durable backing layer 12. The pliable, tacky sealing layer 14 can comprise materials such as urethane, polyurethane, polyvinyl chloride and/or silicone. The pliable tacky layer 14 may have a hardness, as measured by a durometer, at least 10 percent less than the hardness of the durable backing layer 12. In one embodiment, the pliable, tacky sealing layer has a durometer hardness of less than 30 shore A. The pliable, tacky sealing layer 14 may also provide shock absorption for foot traffic, and may serve to keep the protective cover in its desired location due to its tacky surface. The pliable, tacky sealing layer 14 can comprise an inherently tacky material or can have a standard tackifier applied to any exposed surface. The pliable, tacky sealing layer 14 can have a tackiness such that it adheres to a surface surrounding a drain or hole to prevent the flow of liquid from entering the drain. In one embodiment, the pliable, tacky sealing layer 14 has sufficient tackiness such that the sealing layer adheres when pressed against a vertical wall. The tackiness of the sealing layer 14 may also be measured by other test methods known to those skilled in the art, such as rolling ball, peel and probe tests. The pliable, tacky sealing layer 14 has a typical thickness of from 0.01 to 2 inches, for example, from 0.1 to 0.5 inch.

In one embodiment, a mixture of various polyurethanes can be used to make the sealing layer 14. A typical polyurethane mixture comprises from about 50 to about 80 weight percent polyol, and from about 20 to about 50 weight percent isocyanate. The liquid polyurethane is mixed and cured in a manner which gives it a moderate degree of inherent tackiness to all exposed surfaces of the polyurethane material. The molding and curing process creates a substantially smooth exposed surface, which may contain minor undulations. The polyurethane material is soft, yet resilient, and thus may be easily severed by a user with a knife. Surfaces of the polyurethane material which are exposed when a portion of it is severed can also be inherently tacky. While a process is described above for manufacturing polyurethane having an inherent tackiness, one skilled in the art will appreciate that other materials, such as, for example, vinyls, silicones and rubbers, may also be modified to have an inherent tackiness.

In one embodiment, the low-density bonding layer 20 can be deposited on the surface of the durable backing layer 12 through hot air roll laminating or brought into contact with the durable backing layer 12 before it is cured or cooled so that the fibers or protuberances in the Z direction or the openings or voids in the low-density bonding layer are at least partially embedded within the durable backing layer 12. Once the fibers of the low-density bonding layer are embedded within, or otherwise adhered to, the durable backing layer 12, the pliable, tacky sealing layer 14 can be applied to the exposed surface of the durable backing layer 12 including the low-density bonding layer 20. As the pliable, tacky sealing layer 14 cures or cools, the low-density bonding layer 20 improves adhesion between the durable backing layer 12 and the pliable, tacky sealing layer 14.

In accordance with an embodiment of the present invention, the protective cover does not include any type of additional reinforcing layer in, or adjacent to, the backing layer 12, the pliable, tacky sealing layer 14, or the low-density bonding layer 20. Such a non-reinforced protective cover has been found to possess sufficient durability for extended uses, while still maintaining sufficient flexibility and relatively light weight for ease of installation and removal at various types of spill sites.

Figure 3:
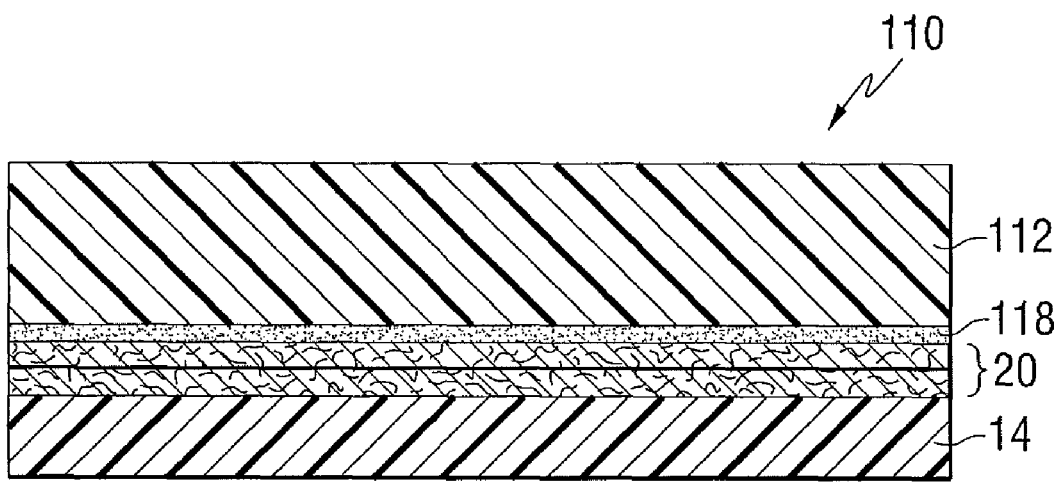
FIG. 3 is a cross-sectional side view of a portion of a protective cover in accordance with another embodiment of the present invention.

FIG. 3 illustrates a durable protective cover 110 similar to the cover shown in FIG. 2, except the durable backing layer 112 is secured to the low-density bonding layer 20 and pliable, tacky sealing layer 14 by an adhesive layer 118. The adhesive layer 118 may comprise any suitable adhesive, such as a hot melt adhesive comprising polyethylene, polypropylene, styrene butadiene rubber, styrenes, nylon, or the like. For example, the adhesive layer may comprise polyethylene having a thickness of about 0.002 inch.

The durable protective covers of the present invention form effective seals around drains, are generally lightweight, and are capable of quick and easy implementation even for large drains. The durable protective covers are readily reusable and transportable, and may be quickly implemented to seal a drain and/or hole in an emergency situation. The protective cover may be implemented for use with a variety of different types and sizes of drains and/or holes, and forms a tight seal around the drain/hole to block out unwanted liquids from entering the drain or hole. The protective cover may also be provided in strip form that may be installed around the periphery of a drain or other area to act as a dike or spill diverter. The protective cover may also serve as an anti-fatigue mat in areas exposed to foot traffic or in areas where people stand for significant amounts of time, in which case the pliable, tacky sealing layer provides shock absorption and maintains the cover in its desired position, while the durable layer resists tearing, abrasion and puncture caused by foot traffic and debris.

Whereas particular embodiments of this invention have been described above for purposes of illustration, it will be evident to those skilled in the art that numerous variations of the details of the present invention may be made without departing from the invention as defined in the appended claims.

The invention claimed is:

1. A durable protective cover for installation over a drain comprising:
   a durable backing layer;
   a pliable, tacky sealing layer structured and arranged to block spills from entering the drain; and
   a low-density bonding layer between the durable backing layer and the pliable, tacky sealing layer.

2. The protective cover of claim 1, wherein the low-density bonding layer has a thickness of at least 0.01 inch.

3. The protective cover of claim 1, wherein the low-density bonding layer has a thickness of from about 0.02 to about 0.25 inch.

4. The protective cover of claim 1, wherein the low-density bonding layer has a density of less than 0.26 ounces per cubic inch.

5. The protective cover of claim 1, wherein the low-density bonding layer has a weight per area of less than 20 ounces per square yard.

6. The protective cover of claim 1, wherein the low-density bonding layer comprises entanglement fibers comprising polyester, polypropylene, poly(ethylene propylene), polyvinylchloride, fiberglass, nylon, cotton and/or urethane.

7. The protective cover of claim 1, wherein the low-density bonding layer comprises polyester.

8. The protective cover of claim 1, wherein the low-density bonding layer comprises fleece.

9. The protective cover of claim 1, wherein the durable backing layer has a thickness of from about 0.01 to about 0.25 inch.

10. The protective cover of claim 1, wherein the durable backing layer has a length of at least 1 foot and a width of at least 1 foot.

11. The protective cover of claim 1, wherein the durable backing layer comprises natural rubber, synthetic rubber, nitrile rubber, thermoplastic olefin, polyvinyl chloride and/or chlorosulfonated polyethylene.

12. The protective cover of claim 1, wherein the durable backing layer comprises rubber.

13. The protective cover of claim 1, wherein the durable backing layer comprises vinyl.

14. The protective cover of claim 1, wherein the pliable, tacky sealing layer has a thickness of from 0.01 to 2 inches.

15. The protective cover of claim 1, wherein the pliable, tacky sealing layer has a length of at least 1 foot and a width of at least 1 foot.

16. The protective cover of claim 1, wherein the pliable, tacky sealing layer has a durometer hardness of less than 30 shore A.

17. The protective cover of claim 1, wherein the pliable, tacky sealing layer comprises urethane, polyurethane, polyvinyl chloride and/or silicone.

18. The protective cover of claim 1, further comprising an adhesive layer between the low-density bonding layer and the durable backing layer.

19. The protective cover of claim 18, wherein the adhesive layer comprises a hot melt adhesive.

* * * * *